Dec. 16, 1947. H. C. GRAY 2,432,752
METHOD OF FORMING LAMINATED RESIN IMPREGNATED STOCK SHEETS
Filed Aug. 19, 1944 4 Sheets-Sheet 1
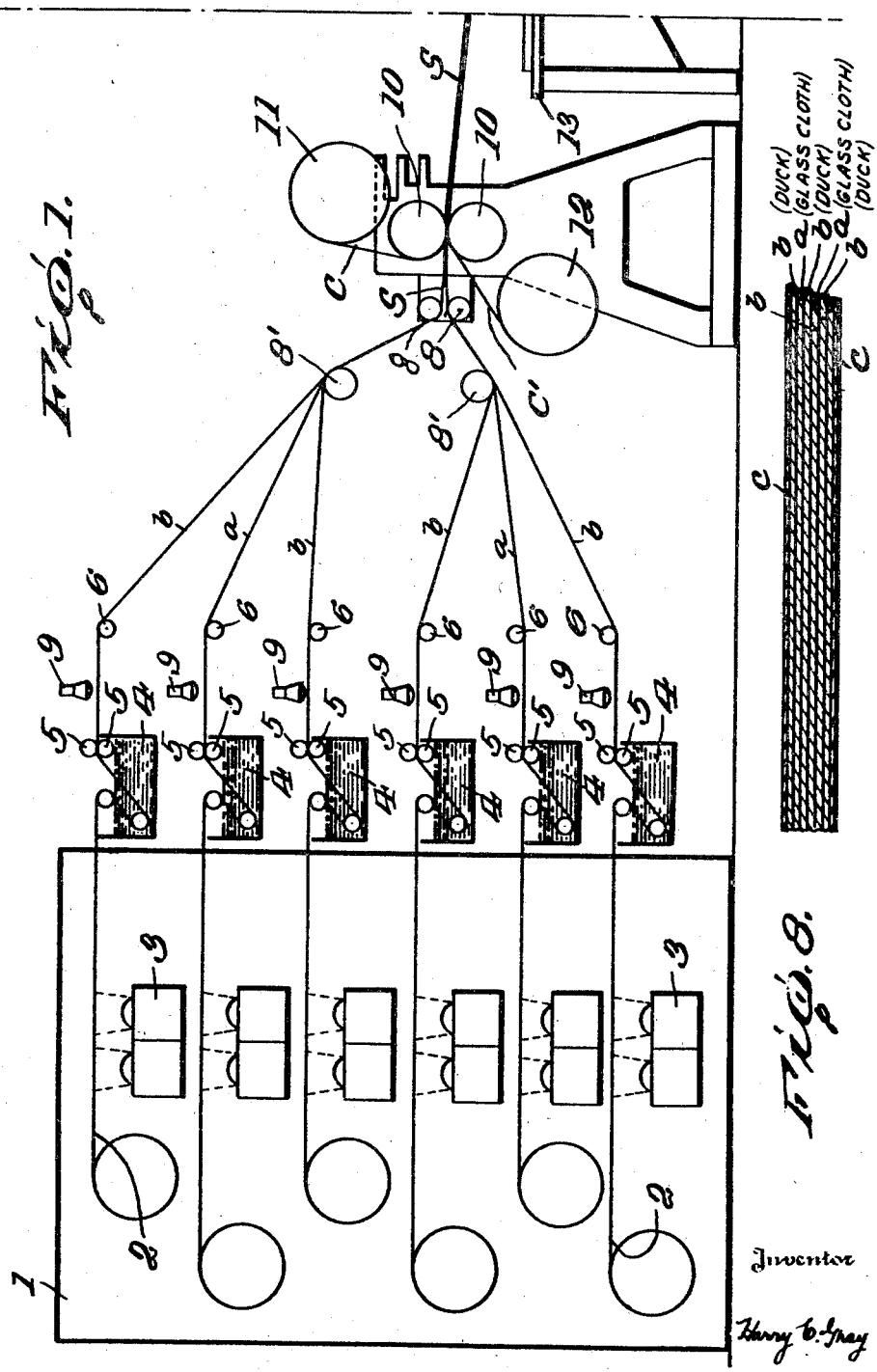

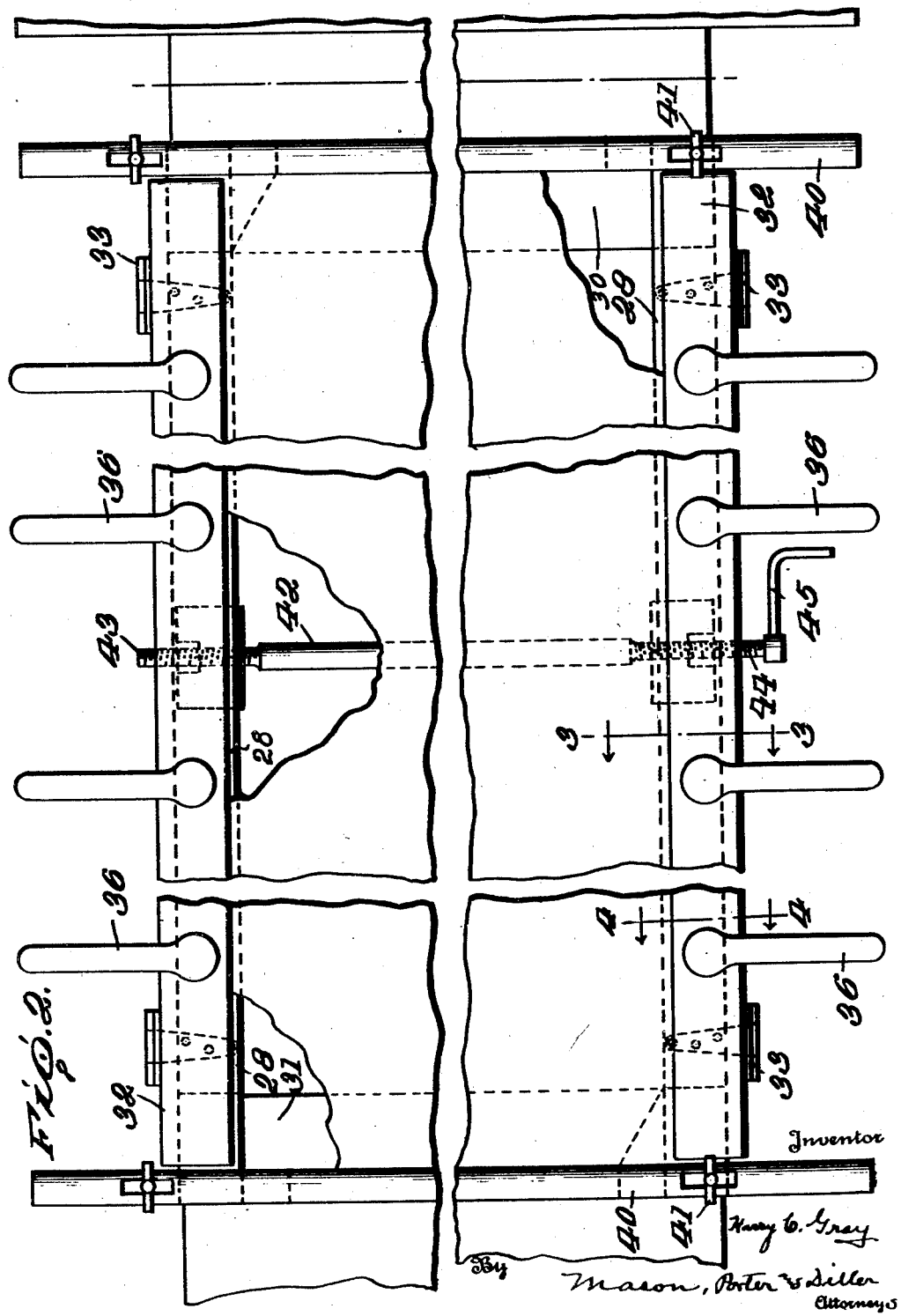

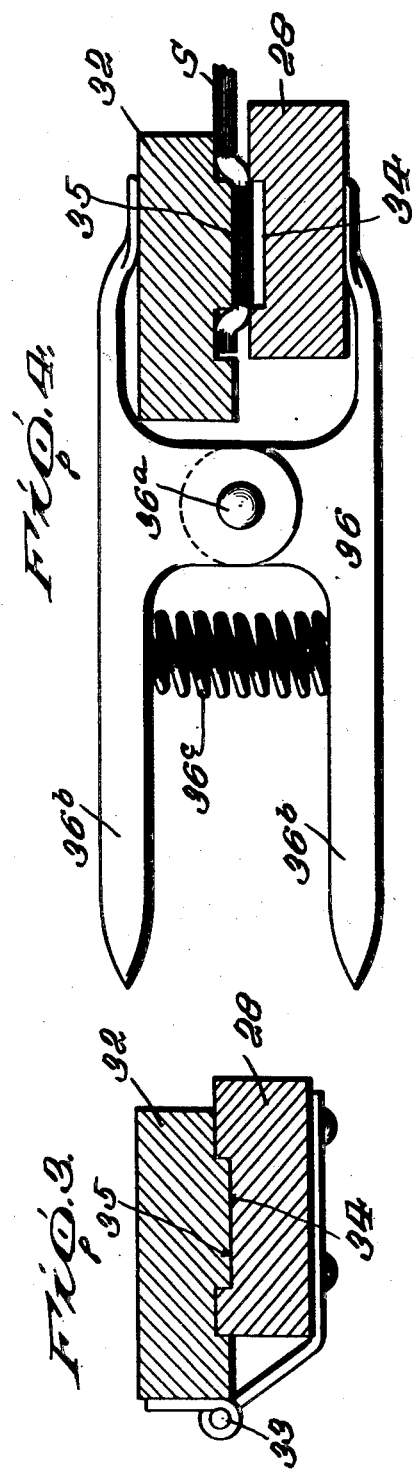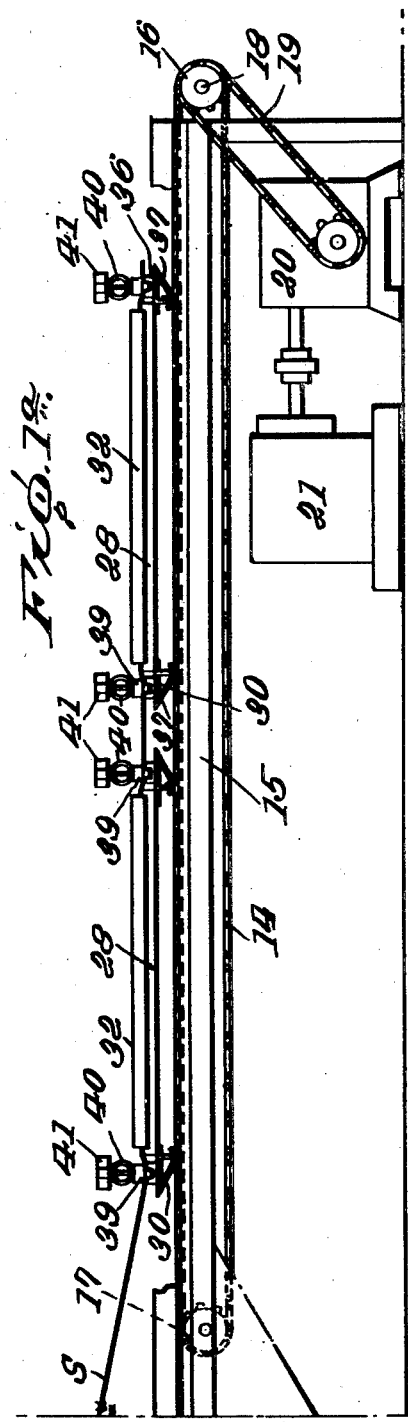

Dec. 16, 1947.                    H. C. GRAY                    2,432,752
METHOD OF FORMING LAMINATED RESIN IMPREGNATED STOCK SHEETS
Filed Aug. 19, 1944                              4 Sheets-Sheet 4
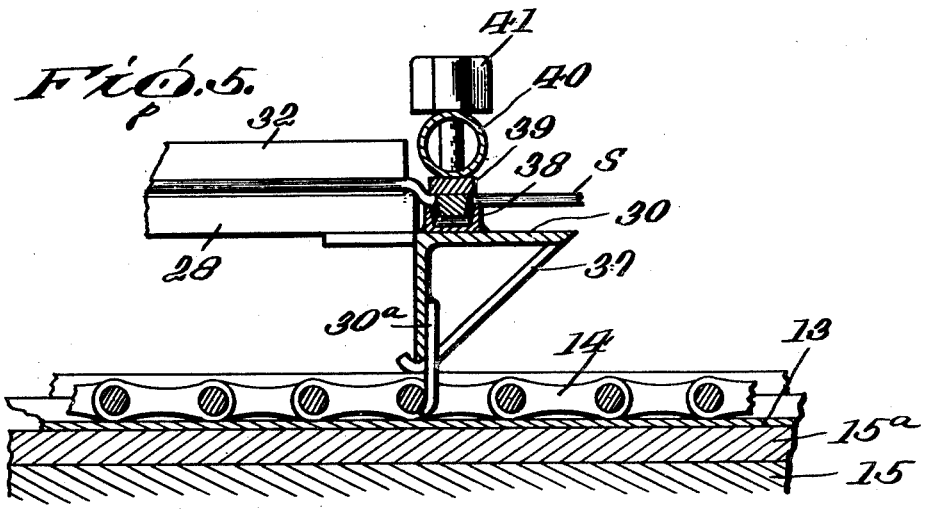
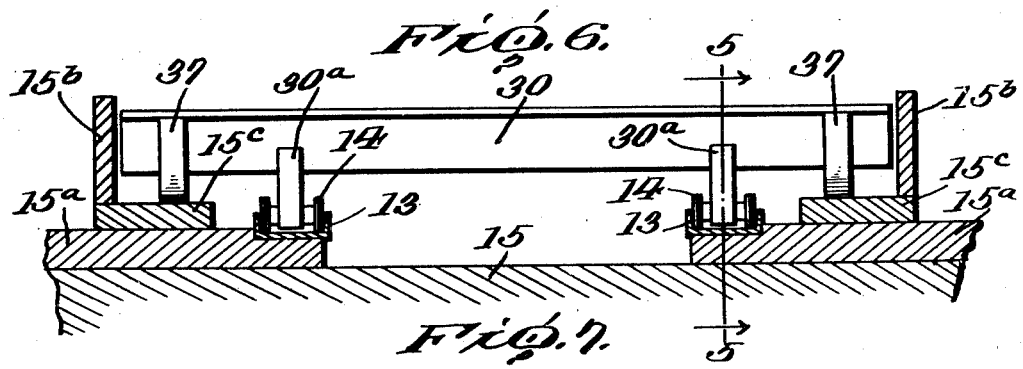
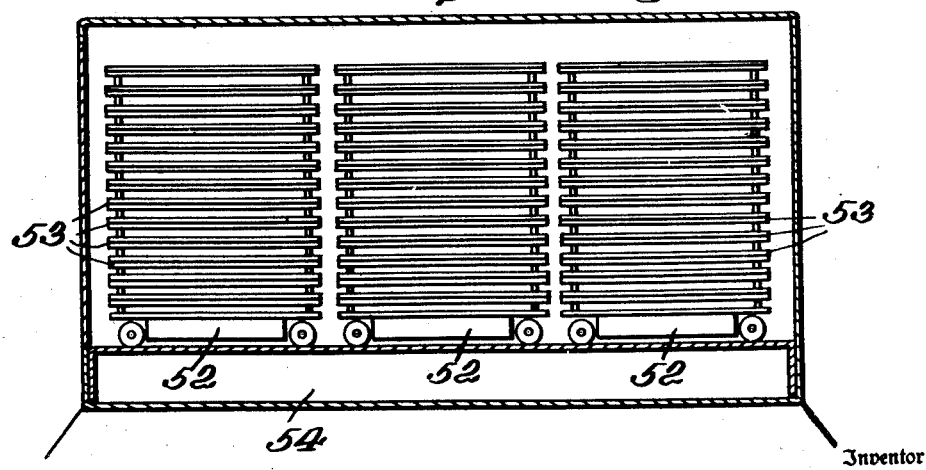
Inventor
Harry C. Gray
Mason, Porter & Diller
Attorneys Patented Dec. 16, 1947

2,432,752

UNITED STATES PATENT OFFICE 2,432,752

METHOD OF FORMING LAMINATED RESIN IMPREGNATED STOCK SHEETS

Harry C. Gray, Chicago, Ill., assignor to Continental Can Company, Inc., New York, N. Y., a corporation of New York Application August 19, 1944, Serial No. 550,300

5 Claims. (Cl. 154—125)

The invention relates to new and useful improvements in a method of forming resin impregnated laminated stock sheets, that is, sheets which may be cut or trimmed into various desired shapes for use.

An object of the invention is to provide a method of forming laminated resin impregnated stock sheets wherein the resin impregnated webs while wet, are laminated, stretched and held smooth and free from wrinkles and in intimate contact during the heat curing and setting of the resins.

A further object of the invention is to provide a method of the above type wherein the laminated webs are enclosed between impervious sheets making intimate contact therewith during the heat treatment for setting the resins.

These and other objects will in part be obvious and will in part be hereinafter more fully disclosed.

In the drawings—

Figure 1 is a side view of the apparatus showing the impregnating of the webs, the collecting of the webs after they are impregnated and the laminating of the same;

Figure 1a is a view showing the assembling table where the curing frames are attached to the laminated strip and the means for pulling the laminated strip and the webs forming the same from the supply through the treating devices and the laminating rolls;

Figure 2 is a plan view of a curing frame which is attached to the webs while under tension;

Figure 3 is a sectional view on the line 3—3 of Figure 2 showing the side frame structure before clamping the web;

Figure 4 is a sectional view on the line 4—4 of Figure 2 showing the webs clamped to the side frame;

Figure 5 is a longitudinal sectional view through a portion of one of the stock supporting frames and also through the table on the line 5—5 of Figure 6;

Figure 6 is a transverse sectional view through the table and showing the end member of a stock supporting frame;

Figure 7 is a diagrammatic view showing the oven in which the stacked curing frames are placed for the curing of the resin; and Figure 8 is a sectional view showing diagrammatically a portion of the stock sheet as attached to the curing frame.

The invention has to do with an apparatus and method of forming stock sheets which are made up of a series of laminated layers of webs, each of which is impregnated with resin. Preferably a synthetic resin of the low pressure curing type is used, such for example as the vinyl acetate copolymer type. It will be understood, however, that other types of resin may be used for impregnating the webs and the impregnating material will be hereinafter referred to as a resin.

The stock sheet as shown in Figures 1 and 8 consists of six layers of resin impregnated fabric material. The layers $a$, $a$ are of glass cloth, while the layers $b$, $b$—$b$, $b$ are of duck. This is just one example of a stock sheet which may be formed by the improved method. It will be readily understood that various forms of material may be used and any desired number of layers. There are also shown in this figure covering sheets $c$, $c$ which are preferably of Cellophane.

The fabric webs both of glass cloth and of duck, are independently impregnated with resin before they are collected and combined into a stock sheet. These webs are independently supported in a suitable frame I. The webs are independently treated with resin and the description of one will answer for the others. The web 2, for example, passes over suitable heating means 3 where the fabric web is heated. The web then passes through a bath 4 of liquid resin wherein the web becomes impregnated with the resin. The web, after leaving the bath of resin, passes between sizing rolls 5—5, sometimes referred to as "doctor rolls." These rolls have a dual function in that they not only squeeze the excess resin from the individual webs so that resin will flow back into the tank, but they also serve as sizing or dimensioning rolls for the individual resin impregnated webs, so that when the webs are collected to form the laminated stock sheets, said webs may be assembled and laminated without again having any appreciable amount of resin squeezed therefrom. After leaving the sizing rolls 5—5, the webs pass over individual guide rolls 6 to collecting rolls 8'. As shown in Figure 1, the three upper webs pass over the upper collecting roll and the three lower webs pass underneath the lower collecting roll. From these collecting rolls the webs pass between guiding rolls 8—8 and then between combining or laminating rolls 10—10.

A heating means, indicated at 9, may be employed for heating the impregnated web after it leaves the bath. If the resin is thin or lightbodied, the heating means may not be necessary, but if it is thick or heavy, then the heating means will reduce the viscosity so that the resin will flow and spread more evenly on the webs and be uniformly distributed throughout the interstices of the webs.

A Cellophane strip C slightly wider than the laminated sheet is led from the supply roll 11 around the upper laminating roll 10 and is thus placed on the upper face of the laminated strip which is to form the stock sheets. A Cellophane strip C' is led from a supply roll 12 over the lower combining or laminating roll 10 and is thus placed on the under face of the laminated strip.

Associated with the devices for impregnating the webs, collecting and laminating the same, is an assembling table 15. Said assembling table is of considerable length. The table includes longitudinally extending members 15a—15a on which are mounted side rails 15b—15b and trackways 15c—15c. Also extending lengthwise of the table and mounted on the members 15a—15a are channel guide members 13—13 in which endless conveyor chains 14—14 run. There are two channel members, one adjacent each side of the table, and two endless conveyor chains. The conveyor chains run over sprocket wheels carried by the shaft 18 at the right of the table (see Figure 1a) and over sprocket wheels 17—17 (one of which is illustrated in Fig. 1a) at the left of the table, as viewed in this figure. The shaft 18 carries a sprocket 16 which is driven by a sprocket chain 19 from a speed changing mechanism 20 operated by a motor 21.

As shown in Figure 1a, two curing frames have been attached to the laminated strip which is indicated at S. It will be understood, however, that the table is very long and that four or five curing frames may be attached to the laminated strip. For the purpose of illustration only two are shown. One of the curing frames is shown in plan in Figure 2. Said curing frame includes side members 28. These side members are spaced from each other a distance substantially equal to the width of the laminated strip. The side members are connected to parallel spaced end bars 30 and 31. The side and end bars are rigidly connected so as to form, as shown in the drawings, a rectangular frame which is of the width of the laminated strip and of a length desired for the stock sheets which are being formed from the laminated strip.

This rigid frame is provided with clamping devices for clamping the laminated strip to said frame. Associated with each side bar 28 is a clamping bar 32 which is secured thereto by hinges 33. The side bars, as shown in Figures 3 and 4, are formed with channels 34. The clamping bar 32 is cut away so as to provide a projecting clamping member 35 which conforms to the channel 34 and is adapted to force the laminated strips into the channel, thus giving a sharp bend thereto and providing a grip on the laminated strip so as to prevent it from slipping out of the clamping means. After the clamping bar has been placed on top of the strip, individual clamping devices 36 are applied which press the clamping bar 32 against the laminated strip and the laminated strip in turn against the side frames.

These clamping devices 36 include two members which are pivoted together at 36a. Each member has a projecting handle 36b and between the projecting handles 36b is a spring 36c which normally forces the inner ends of the clamping devices into engagement with the frame members.

The end bars 30 are of metal and each bar includes a horizontal member and a vertical member, see Fig. 5. Adjacent each end of the bar 30 is a shoe 37. This shoe 37 is welded to the end bar and extends beneath the vertical web of the end bar so as to provide a curved end portion which rests on the trackway 15c. This provides a support for each end bar at each side of the table. The vertical member of the end bar 30 is also provided with two depending dogs 30a—30a. These dogs are rigidly attached to the end member and project downwardly therefrom so as to engage between the side links of the conveyor chains. This provides a connection between the conveyor chains and the frames so that they are moved slowly endwise along the table.

The end bar 30 is provided with a channel member 38. The laminated strip is laid across this channel and is forced down into the channel by a clamping bar 39 having a truncated wedge-shaped clamping member on its under face. A presser bar 40 is forced into engagement with the upper face of the clamping bar 39 by clamping bolts 41—41.

This curing frame which has been described somewhat in detail, is shown, described and claimed in a copending application Serial No. 553,073, filed September 7, 1944. The frame is illustrated solely for the purpose of showing one form of curing frame which may be attached to the laminated strip.

An expansion bar 42 extends from one side of the frame to the other and has threaded sections 43—44 which pass through nuts carried by the side frame members 28. This expansion bar may be turned by means of a handle 45. After the frame has been clamped to the laminated strip, this bar is turned so as to place the intermediate portion of the side members under tension so as to ensure that the laminated stock will not shrink and wrinkle during curing.

In the operation of the apparatus, the strip is pulled through the laminating rolls, and a curing frame including the end bars and side members is placed on the table beneath the strip when the strip has been pulled through the rolls far enough to be attached to the frame. The strip is then laid on the curing frame and secured thereto. The motor is then started and in the preferred form of the apparatus, the motor will be operated continuously so as to move the end bar of the curing frame to which the laminated strip is clamped slowly over the table. This puts the strip under tension, pulling it through the combining or laminating rolls and also pulling each web from its supply through the impregnating bath associated therewith. The strip is clamped to the trailing end member of the curing frame and is also clamped to the side members. As this frame with the attached laminated strip moves along over the table, a second frame is attached to the laminated strips as shown in Figure 1a. As noted, the table is of sufficient length so that several curing frames may be attached one after the other to the laminated strip. This, however, is immaterial but it is essential that one of the frames, or at least one of the end members, shall be clamped to the strip for moving the same. After a frame has been attached to the laminated strip and another frame or end member applied thereto so that it can effect the movement of the laminated strip, then the strip is cut between the advanced frame and the one following, thus completing the formation of the laminated stock sheet.

It will be understood that the Cellophane strips C—C' completely cover the upper and lower faces of the laminated strip and are clamped to the laminated strip by clamping members of the curing frame. The curing frame is attached to the laminated strip while it is under tension for holding said strip while the resin is wet, stretched and free from wrinkles with all the layers of the laminated strip in intimate contact and free from bubbles between the laminations. While the conveyor chains are described as being continuously operated, it will be understood, of course, that these conveyor chains may be intermittently operated if so desired, by the stopping of the motor when it is desired to sever the strip between curing frames or for the attachment of the curing frames to the strip.

After the frames have been attached to the laminated strip and the strip cut across between the frames as described above, the frames are stacked on suitable trucks, diagrammatically shown at 52 in Figure 7. The stacked frames are illustrated in this figure at 53. A series of trucks with the frames thereon are placed in an oven diagrammatically illustrated at 54 in Figure 7. This oven is preferably a baking oven with suitable control devices for regulating the temperature of the oven. The oven, of course, is closed during the treatment and the temperatures are regulated for different periods of time to suit the resin which is being cured and set. After the heat treatment, the trucks are removed from the oven and the stock sheets released from the curing frames. The stock sheets may be trimmed or cut into any desired shape for use and the Cellophane covering strips then removed.

It is believed that the improved method of producing stock sheets carried out by the apparatus described more or less in detail above, will be readily understood. Briefly the method consists in first impregnating fabric webs with resin, sizing the resin impregnated webs and then collecting said webs and laminating the same into a strip. During the laminating or combining of the fabric webs into the strip, covering strips are placed on opposite faces thereof. Cellophane or some other impervious material is used for this purpose. The method also consists in the placing of the laminated strip under tension and while it is under tension, the attaching of curing frames to the strip which curing frames hold a section of the laminated strip smooth and free from wrinkles with the layers of the laminated strip in intimate contact and free from any bubbles. After the laminated strip has been secured to the curing frame, then the strip is cut so as to separate the sections to which the frames have been attached from the supply strip. The curing frames are then stacked on trucks and transferred to a baking oven where the resin impregnated strips are subjected to heat treatment for curing and setting the resin. By the steps as noted, the wet impregnated webs are brought together and laminated and while in a wet condition and under tension are secured to the curing frames which hold the laminated layers in intimate contact, smooth and free from wrinkles and encased in the impervious Cellophane covering strips so as to prevent contact of air with the resin during the heat treatment thereof.

While it is preferred to use woven materials in the making up of stock sheets, it is understood that these webs, so far as the present apparatus is concerned, may be made of other materials and in other forms than woven provided they are capable of resin impregnation.

I claim:

1. The method of forming laminated resin impregnated stock sheets consisting in combining wet resin impregnated fabric webs into a laminated strip with a covering sheet impervious to air and said resin at each face thereof, placing said strip and covering sheets under longitudinal tension, clamping a curing frame across the laminated covered strip and along the intervening side edges thereof, while wet and under said tension so as to hold the clamped section smooth and free from wrinkles with the covering sheets in intimate contact thereof during curing, severing the clamped section from the strip and subjecting the same to heat treatment for curing and setting the resin.

2. The method of forming laminated resin impregnated stock sheets consisting in independently impregnating fabric webs with resin, sizing the impregnated webs, heating the impregnated webs after sizing for uniformly distributing the resin, combining the wet resin impregnated webs into a laminated strip, clamping a curing frame across the laminated strip and along the intervening side edges thereof so as to hold the clamped section smooth and free from wrinkles during curing, severing the clamped section from the strip and subjecting the same to heat treatment for curing and setting the resin.

3. The method of forming laminated resin impregnated stock sheets consisting in independently impregnating fabric webs with resin, sizing the impregnated webs, heating the impregnated webs after sizing for uniformly distributing the resin, combining the wet resin impregnated fabric webs into a laminated strip by pulling the webs from their supplies through laminating rolls, clamping a curing frame across the laminated strip and along the intervening side edges thereof while wet and under the pulling tension so as to hold the clamped section smooth and free from wrinkles during curing, severing the clamped section from the strip and subjecting the same to heat treatment for curing and setting the resin.

4. The method of forming laminated resin impregnated stock sheets consisting in independently impregnating fabric webs with resin, sizing the impregnated webs, heating the impregnated webs after sizing for uniformly distributing the resin, combining the wet resin impregnated fabric webs into a laminated strip with a covering sheet impervious to air and said resin at each face thereof by pulling the webs and covering strips from their supplies through laminating rolls, clamping a curing frame across the laminated covered strip and along the intervening side edges thereof while wet and under the pulling tension so as to hold the clamped section smooth and free from wrinkles and the layers in intimate contact during curing, severing the clamped section from the strip and subjecting the same to heat treatment for curing and setting the resin.

5. The method of forming laminated resin-impregnated sheets consisting in combining wet resin-impregnated fabric webs into a laminated strip by placing the strip under longitudinal tension, clamping a frame across the laminated strip and along the intervening side edges thereof while under said tension, applying tension laterally of the frame and web, severing the clamped section of the strip from the remainder and submitting the said section to a heat treatment while still under tension in both directions.

HARRY C. GRAY.

(References on following page)

REFERENCES CITED

The following references are of record in the file of this patent:

UNITED STATES PATENTS

| Number | Name | Date |
|---|---|---|
| 2,352,285 | Proctor | June 27, 1944 |
| 2,311,013 | Whitehead | Feb. 16, 1943 |
| 2,183,599 | Welch | Dec. 19, 1939 |
| 2,310,619 | Dillehay | Feb. 9, 1943 |
| 2,238,534 | McDonald | Apr. 15, 1941 |
| 2,348,081 | Linzell | May 2, 1944 |
| 1,765,829 | Fox et al. | June 24, 1930 |
| 1,645,580 | Bock | Oct. 18, 1927 |
| 1,777,643 | Hitchcock | Oct. 7, 1930 |
| 2,291,651 | Robinson | Aug. 4, 1942 |
| 1,235,425 | Bradshaw | July 3, 1917 |
| 1,806,841 | Czapek et al. | May 26, 1931 |
| 2,397,838 | Chavannes | Apr. 2, 1946 |